United States Patent
Bawden

(10) Patent No.: US 9,999,216 B1
(45) Date of Patent: Jun. 19, 2018

(54) FOWL DECOY

(71) Applicant: Robert Michiel Bawden, West Jordan, UT (US)

(72) Inventor: Robert Michiel Bawden, West Jordan, UT (US)

(*) Notice: Subject to any disclaimer, the term of this patent is extended or adjusted under 35 U.S.C. 154(b) by 391 days.

(21) Appl. No.: 14/794,679

(22) Filed: Jul. 8, 2015

(51) Int. Cl.
*A01M 31/06* (2006.01)
*A01M 99/00* (2006.01)

(52) U.S. Cl.
CPC ............ *A01M 31/06* (2013.01); *A01M 99/00* (2013.01)

(58) Field of Classification Search
CPC ............................. A01M 31/06; A01M 99/00
USPC ............................................................ 43/2, 3
See application file for complete search history.

(56) References Cited

U.S. PATENT DOCUMENTS

| | | | | | |
|---|---|---|---|---|---|
| 410,523 | A * | 9/1889 | Jencks | ............ | A01M 31/06 24/115 J |
| 1,468,979 | A * | 9/1923 | Sherman | ............ | A01M 31/06 43/3 |
| 2,196,078 | A * | 4/1940 | Pearce | ............ | A01M 31/06 43/3 |
| 2,237,194 | A * | 4/1941 | Ohnmacht | ............ | A01M 31/06 43/3 |
| 2,267,357 | A * | 12/1941 | Soule | ............ | A01M 31/06 43/3 |
| 2,430,645 | A * | 11/1947 | Mills | ............ | A01M 31/06 43/3 |
| 2,651,873 | A * | 9/1953 | Risch | ............ | A01M 31/06 43/3 |
| 3,408,763 | A * | 11/1968 | Rudolph | ............ | A01M 31/06 43/3 |
| 6,560,912 | B1 * | 5/2003 | Achepohl | ............ | A01M 31/06 43/3 |
| 9,084,716 | B1 * | 7/2015 | Bawden | ............ | A61J 17/001 |
| 2006/0123688 | A1 * | 6/2006 | Box | ............ | A01M 31/06 43/3 |
| 2013/0014423 | A1 * | 1/2013 | Tonkovich | ............ | A01M 31/06 43/3 |
| 2014/0338249 | A1 * | 11/2014 | Heiges | ............ | A01M 31/06 43/3 |
| 2015/0208639 | A1 * | 7/2015 | Funderburg | ............ | A01M 31/06 43/3 |
| 2016/0106090 | A1 * | 4/2016 | Young | ............ | A01M 31/06 43/2 |

* cited by examiner

*Primary Examiner* — Joshua D Huson
*Assistant Examiner* — Michael A. Fabula
(74) *Attorney, Agent, or Firm* — Plager Schack LLP

(57) ABSTRACT

A decoy for luring waterfowl has a body that has an upper reservoir partially filled with water. A neck is partially submerged in the upper reservoir. A head, is attached to the neck and configured to raise a neck center of gravity and lower a neck center of buoyancy. Wherein the neck is configured to rotate within the upper reservoir.

4 Claims, 4 Drawing Sheets

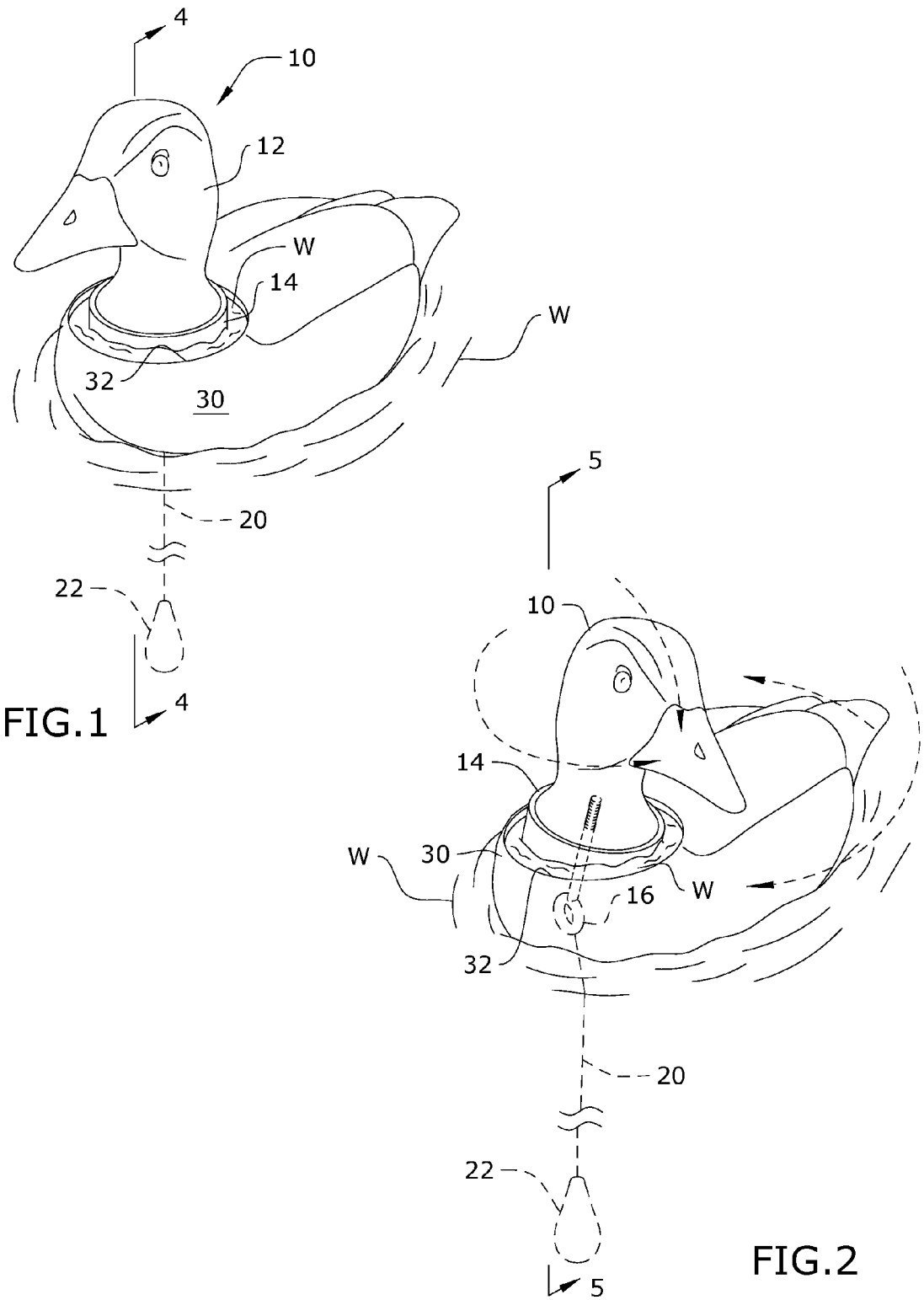

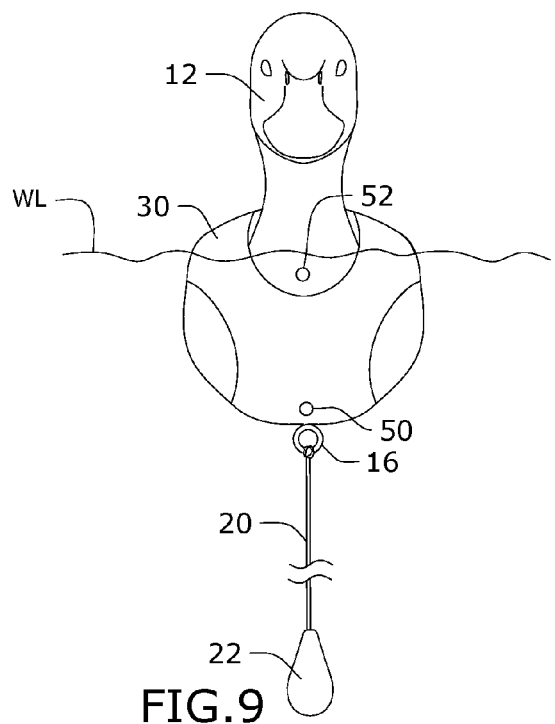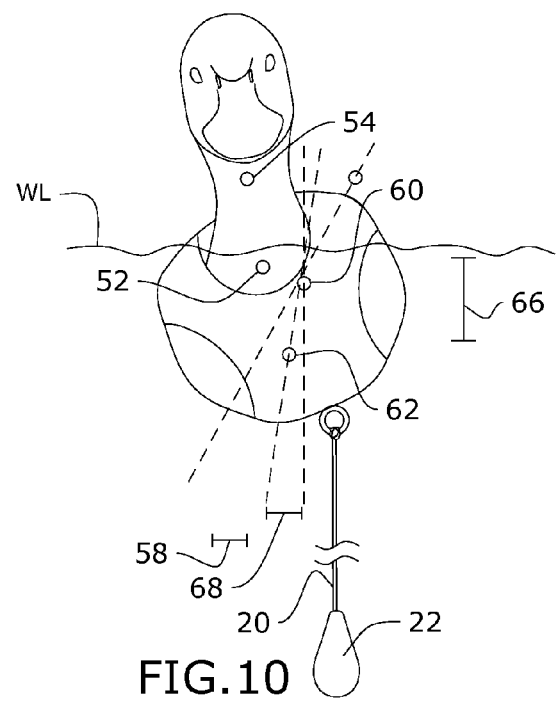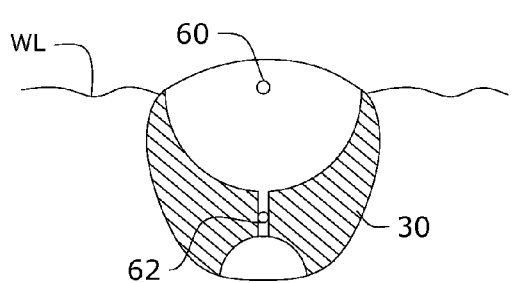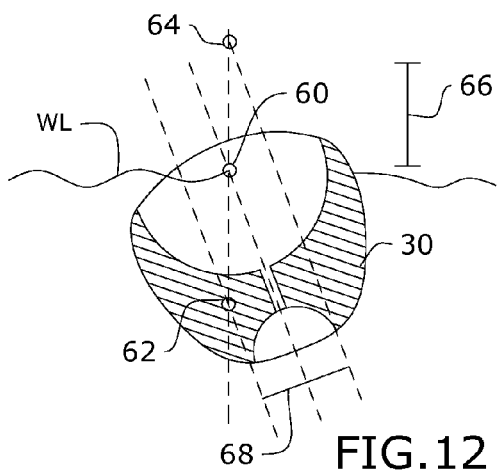

FOWL DECOY

BACKGROUND

The embodiments herein relate generally to devices used to distract water fowl.

Prior to embodiments of the disclosed invention, water fowl decoys had a statuesque posture that did not realistically reflect the three dimensional movement of water fowl in water. As used in this application, "realistic fowl movement" means movement that includes independent neck and body rotational movement in at least two dimensions in spherical coordinates. Spherical coordinates include Rho, Theta, and Phi. Rho is the distance from the origin to the point. Theta is the same as the angle used in polar coordinates. Phi is the angle between the z-axis and the line connecting the origin and the point. Embodiments of the disclosed invention solve that problem.

SUMMARY

A decoy for luring waterfowl, includes a body, further comprising an upper reservoir partially filled with water. A neck is partially submerged in the upper reservoir. A head is attached to the neck and configured to raise a neck center of gravity and lower a neck center of buoyancy. The neck is configured to rotate within the upper reservoir.

In some embodiments, a central channel is formed within the body. An anchor is attached to the neck with an anchor line through the central channel. The head, when rotating, causes the anchor line to push against the central channel creating a force opposing further rotation that limits motion of the head.

In some embodiments, the neck has a neck geometric metacenter, a neck metacentric height and a neck righting arm. The body has a body center of gravity, a body center of buoyancy, a body geometric metacenter, a body metacentric height and a body righting arm.

The body righting arm is at least three times greater than the neck righting arm for all rolls greater than 5 degrees.

BRIEF DESCRIPTION OF THE FIGURES

The detailed description of some embodiments of the invention is made below with reference to the accompanying figures, wherein like numerals represent corresponding parts of the figures.

FIG. 1 is a perspective view of an embodiment of the invention.

FIG. 2 is a perspective view demonstrating rotational floating motion of the head while in the reservoir of the body creating opposite and independent movement from the body.

FIG. 9 shows a schematic loading diagram of the body.
FIG. 10 shows a schematic loading diagram of the body.
FIG. 11 shows a schematic loading diagram of the body.
FIG. 12 shows a schematic loading diagram of the body.

DETAILED DESCRIPTION OF CERTAIN EMBODIMENTS

Figure 3:
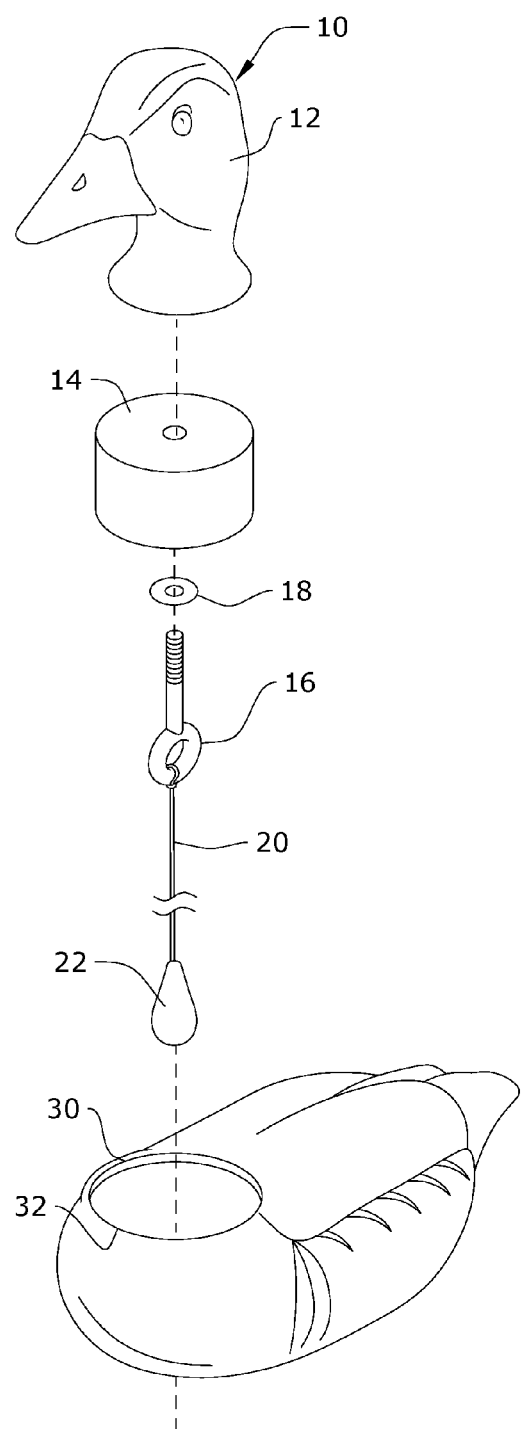
FIG. 3 is an exploded view of an embodiment of the invention.

By way of example, and referring to FIGS. 1-3, one embodiment of decoy 10 comprises head 12 mechanically coupled to neck 14 with eye bolt 16. In some embodiments this can be done with washer 18. Eyebolt 16 is mechanically coupled to anchor line 20. Anchor line 20 is mechanically coupled to anchor 22.

Figure 4:
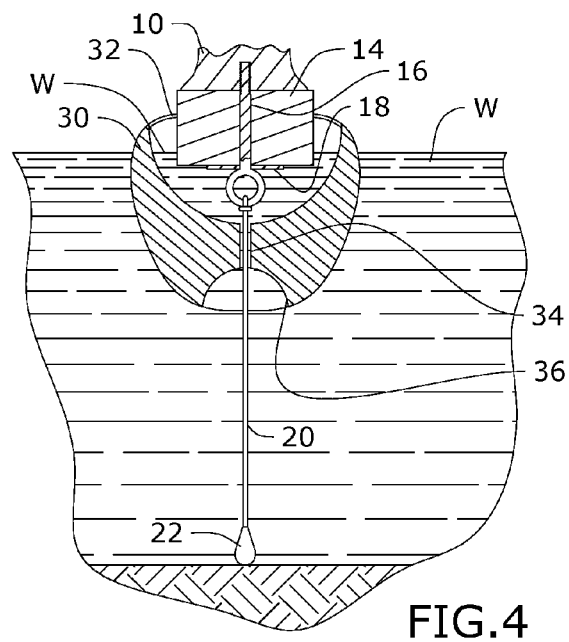
FIG. 4 is a section view of an embodiment of the invention along line 4-4 in FIG. 1.
Figure 5:
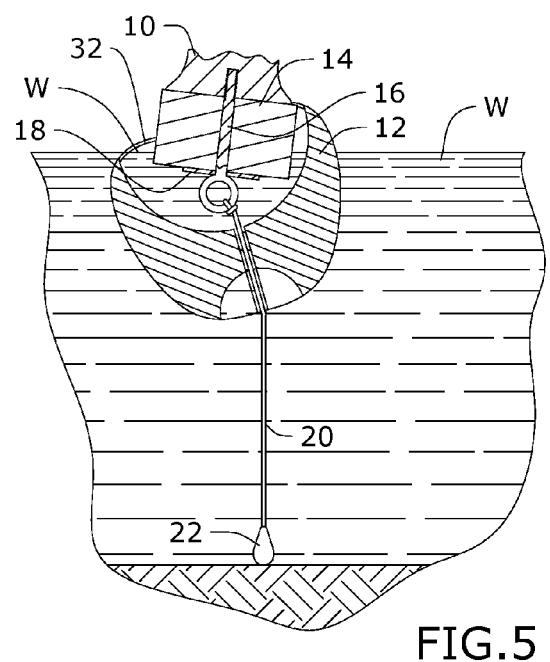
FIG. 5 is a section view of an embodiment of the invention along line 5-5 in FIG. 2.

Turning to FIG. 4-5, body 30 further comprises upper reservoir 32 which is directly joined to central channel 34. Central channel 34 opens into lower reservoir 36.

Figure 6:
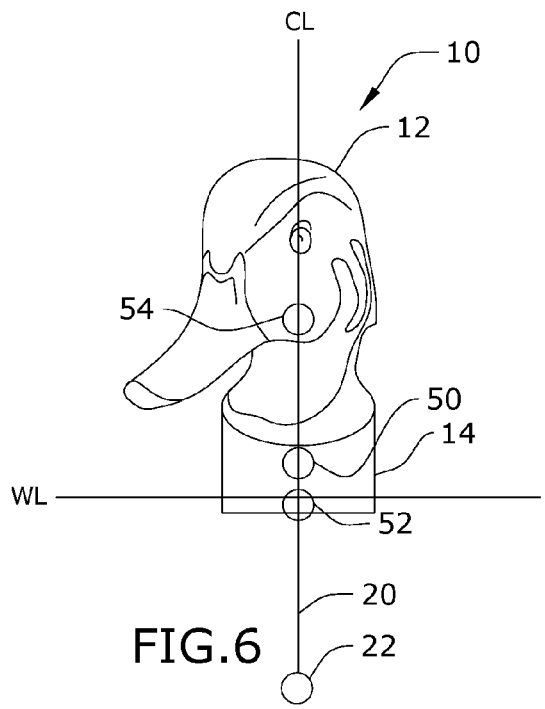
FIG. 6 shows a schematic loading diagram of the head.
Figure 7:
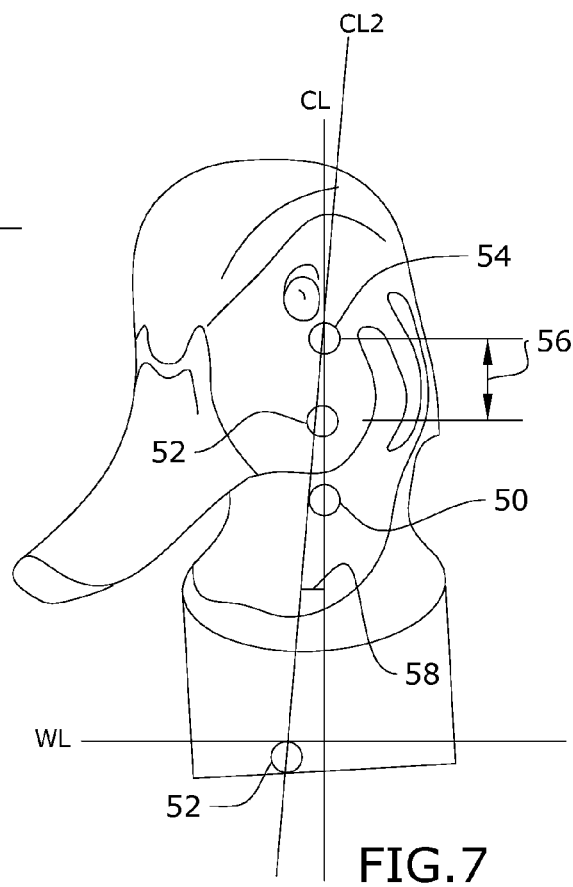
FIG. 7 shows a schematic loading diagram of the head.
Figure 8:
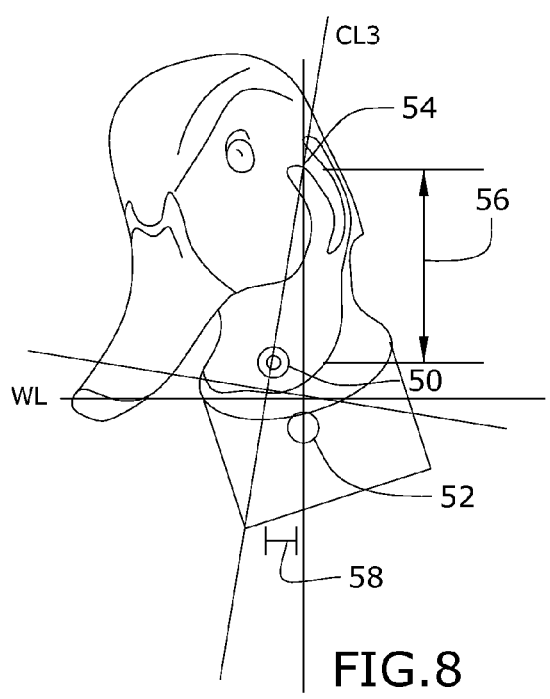
FIG. 8 shows a schematic loading diagram of the body.

Turning to FIG. 6, FIG. 7, and FIG. 8 neck 14 should be made of a buoyant material that is configured to lift head 12 from body 30. When resting in water W, body 30 will sink substantially to waterline WL, causing water W to fill upper reservoir 32. FIG. 6 and FIG. 7 show this without regard to body 30. Body 30 has a first centerline CL. As with anything in hydrostatics, head 12 and neck 14 have neck center of gravity 50, neck center of buoyancy 52, neck geometric metacenter 54, neck metacentric height 56 and neck righting arm 58. As FIG. 7 shows, movements by small forces of approximately one newton applied to head 12 will cause head 12 and neck 14 to rotate violently resulting in a second centerline CL2 and a third centerline CL3 and become unstable as the reserve buoyancy quickly drops below zero. However, water fowl do not typically have that much head motion from wing to wing or side to side. Decoy 10 solves that problem by having an anchor attached to a central eyebolt 16. When neck 14 is rotated, anchor line 20 exerts a force upon central channel 34 that causes central channel 34 to act much like a keel in providing a force opposing further rotation like a spring onto head 12 and neck 14. In effect this creates a rotating and swaying motion of head 12 that resembles the natural pattern of water fowl.

Turning to FIG. 7 and FIG. 8, when resting in water W, body 30 will sink substantially to waterline WL, causing water W to fill upper reservoir 32 as noted above. As with anything in hydrostatics, body 30 has body center of gravity 60, body center of buoyancy 62, body geometric metacenter 64, body metacentric height 66 and body righting arm 68. In a substantial deviation from previous endeavors in this field, body righting arm 68 is at least three times greater than neck righting arm 58 for all rolls greater than 5 degrees when both components are upright. In this regard, body 30 rotates much less than neck 14, much like water fowl do. Body 30 can rotate in theta and phi directions. Likewise, neck 14 can rotate in theta and phi directions. Thus, decoy 10 emulates realistic water fowl movement.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A decoy for luring waterfowl with realistic water fowl movement, the decoy comprising:
   a body, forming an upper reservoir configured to be partially filled with water;
   a neck, configured to be partially submerged in the water of the upper reservoir;
   a head, attached to the neck and configured to raise a neck center of gravity and lower a neck center of buoyancy;
   wherein the neck is configured to rotate within the upper reservoir;
   a channel formed within the body;
   an anchor attached to the neck by an anchor line passing through the channel;
   wherein the neck has a neck geometric metacenter, a neck metacentric height and a neck righting arm;
   wherein the body has a body center of gravity, a body center of buoyancy, a body geometric metacenter, a body metacentric height and a body righting arm;
   wherein the body righting arm is at least three times greater than the neck righting arm for all rolls greater than 5 degrees.

2. The decoy of claim 1, wherein the neck and the body are adapted to rotate in theta and phi directions in spherical coordinates such that neck movement does not affect body movement and body movement does not affect neck movement.

3. A decoy for luring waterfowl with realistic water fowl movement, the decoy comprising:
   a first assembly further comprising:
      a body, forming an upper reservoir configured to be partially filled with water, and
      a channel, formed within the body; and
   a second assembly further comprising:
      a head attached to a neck,
         wherein the neck is configured to be partially submerged in the upper reservoir, and
         wherein the head and neck are configured to rotate within the upper reservoir, and
      an anchor line, attached to the neck and further attached to an anchor,
         wherein the anchor line passes through the channel;
      wherein the head, when rotating, causes the anchor line to push against the channel creating a force that limits further rotation of the head; and
      wherein the first and second assemblies are only coupled by contact of the anchor line and the channel.

4. The decoy of claim 3, wherein the neck and the body are adapted to rotate in theta and phi directions in spherical coordinates such that neck movement does not affect body movement and body movement does not affect neck movement.

* * * * *